United States Patent [19]
Bauer

[11] 3,799,217
[45] Mar. 26, 1974

[54] LIQUID LOADING SYSTEM

[75] Inventor: William J. Bauer, La Grange, Ill.

[73] Assignee: Bauer Engineering, Inc., Chicago, Ill.

[22] Filed: Jan. 17, 1972

[21] Appl. No.: 218,412

[52] U.S. Cl............................ 141/1, 61/12, 61/63, 141/387, 210/513
[51] Int. Cl.............................................. B65b 37/00
[58] Field of Search.......... 141/1, 5, 37, 45, 59, 60, 141/82, 154, 231, 232, 233, 250, 255, 256, 284, 324, 374, 375, 387; 137/344, 580; 222/318; 220/26 S; 61/12, 63; 4/10; 210/170, 416, 513

[56] References Cited
UNITED STATES PATENTS

| | | | |
|---|---|---|---|
| 2,718,433 | 9/1955 | Poynor et al. | 61/12 |
| 3,036,342 | 5/1962 | Fino | 220/26 S |
| 3,019,813 | 2/1962 | Dommann | 137/580 |
| 3,587,932 | 6/1971 | Baum | 222/318 |
| 1,700,405 | 1/1929 | Guidi | 141/231 |
| 3,464,465 | 9/1969 | Daugherty | 141/59 |
| 2,928,436 | 3/1960 | Wendrow et al. | 141/231 |
| 1,987,581 | 1/1935 | Schneider | 141/82 |

Primary Examiner—Houston S. Bell, Jr.
Assistant Examiner—Frederick R. Schmidt
Attorney, Agent, or Firm—Neuman, Williams, Anderson & Olson

[57] ABSTRACT

Pumpable material, such as sewage sludge, is stored in an elongated lagoon and pumped into successive tank cars of a unit train on a parallel adjacent track. The pumps are positioned on a movable platform which travels along the length of the lagoon and train, filling each car.

20 Claims, 8 Drawing Figures

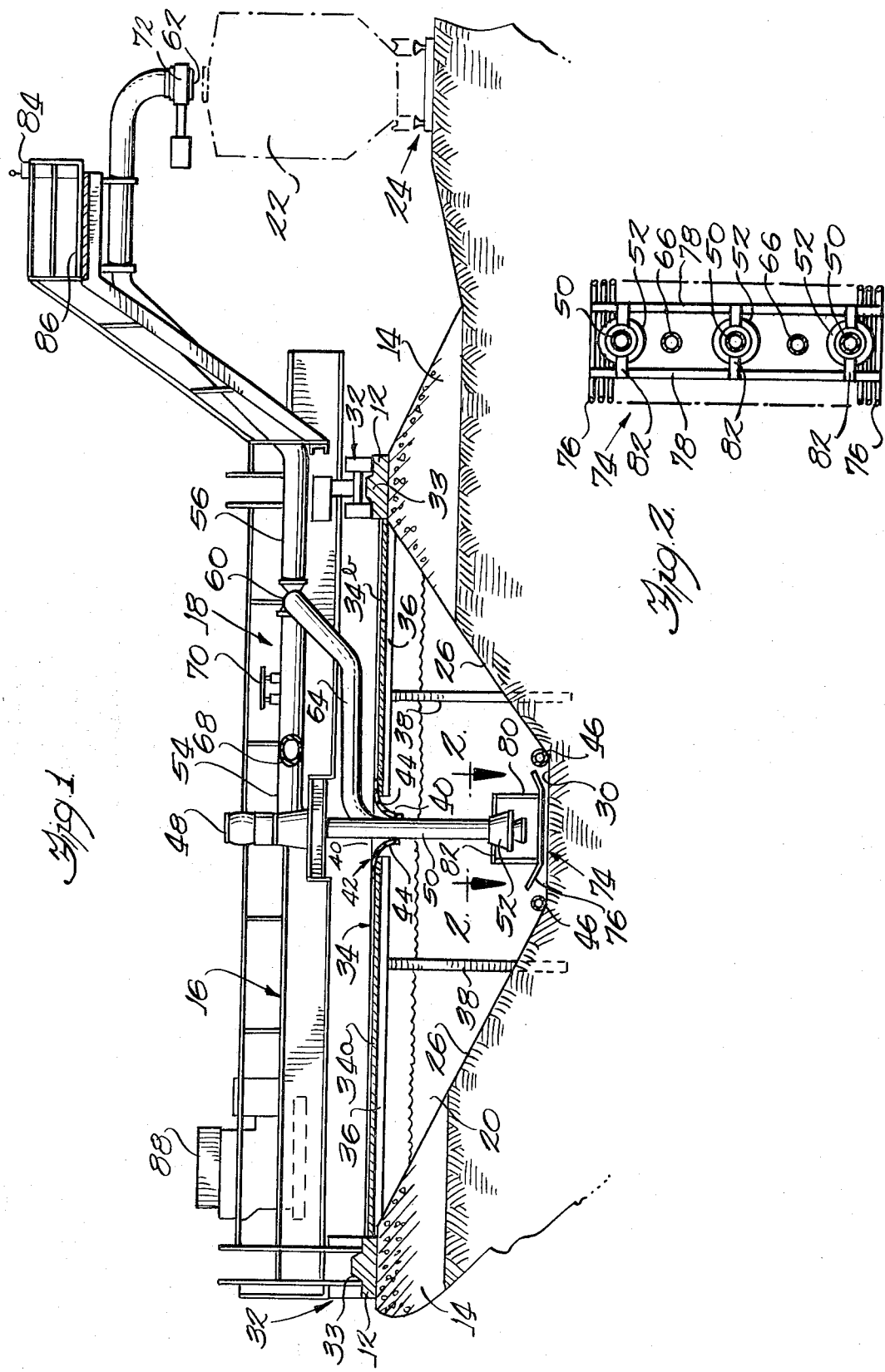

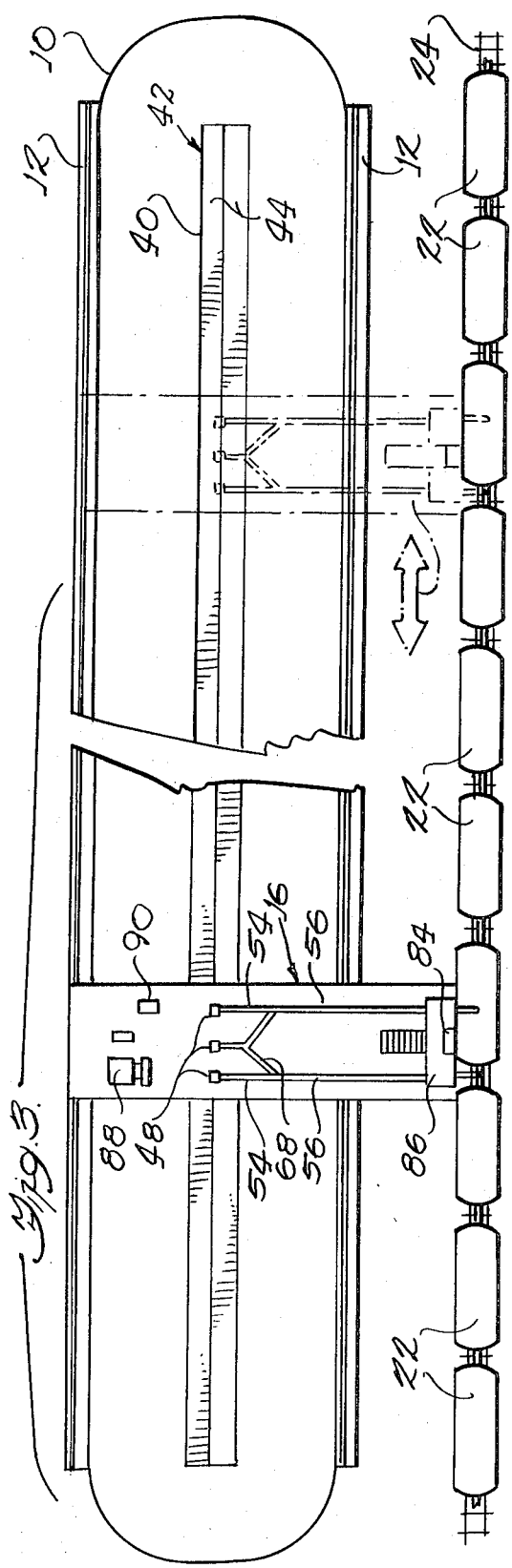
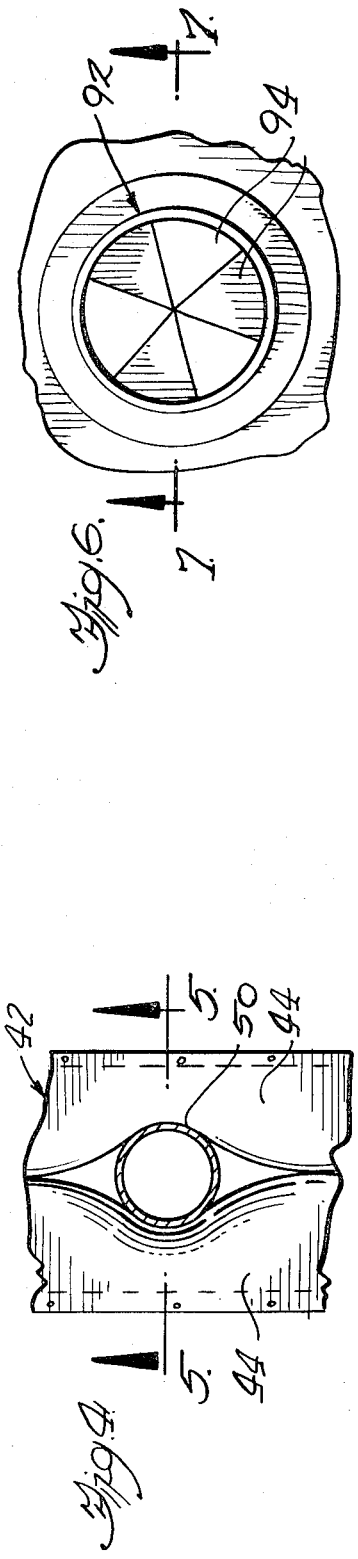
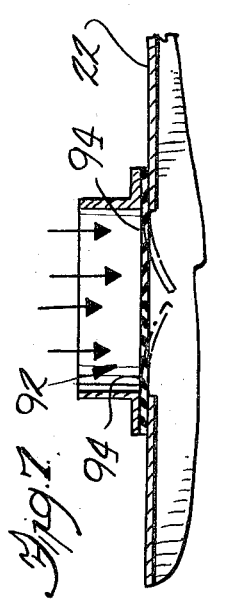
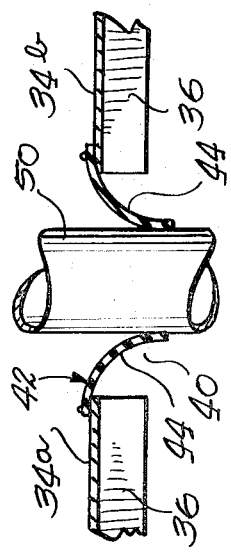

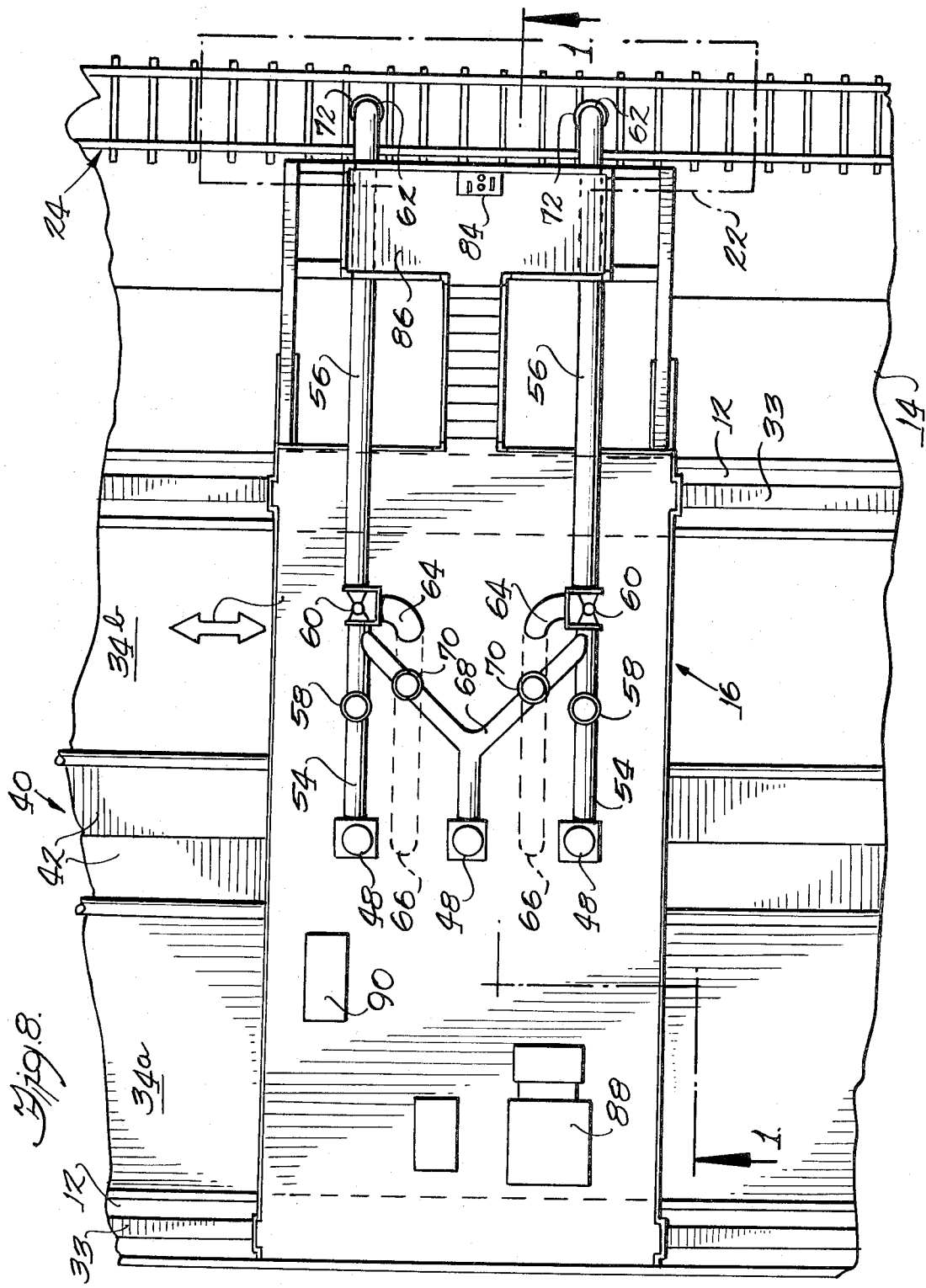

LIQUID LOADING SYSTEM

BACKGROUND OF THE INVENTION

This invention relates generally to material handling and more particularly concerns the pumping and loading of pumpable materials into rail cars from elongated storage lagoons.

Although the invention may be adapted to handle any pumpable liquid or semi-liquid material, it is especially useful for handling large volumes of liquid derived from sewage treatment plants, such as sewage sludge. Sewage treatment plants for large metropolitan areas produce large quantities of sludge. These large volumes of sludge eventually must be removed, such as to be utilized for agricultural purposes, thereby creating a vital recycling system.

A substantial problem to date has been the cost of handling the sludge for removal from storage lagoons. Significant aspects of this problem have been to obtain rapid loading and unloading of the material in railroad tank cars or other transport vehicles to achieve high utilization of the transport equipment, thereby reducing the total shipping costs. Minimum round trip time for repetitive hauling of large quantities of sludge is necessary to achieve low-cost transportation of such material in order to make the system practical and efficient. The present invention is primarily directed toward the solution of this handling problem. Current population growth and concerns for environmental quality have added a dimension of urgency to obtaining these solutions.

Moreover, in one of its aspects, the present invention is also concerned with the solution to an environmental problem inherent with many liquids and particularly with sewage material, namely, odor. Undesirable odors may arise during storage, during the handling operation, or during shipment of a particular liquid or sewage sludge. Since storage lagoons for sewage sludge normally are necessarily located near densely populated areas, possible odors have constituted significant restrictive design considerations in sewage material handling systems. The present invention solves this offensive problem in a simple, unique and efficient manner.

Another problem encountered when attempting to handle watery material during the winter months is possible freezing conditions which can render pumping impossible or impractical. This problem is also solved by the present invention.

Particulate matter suspended in a liquid stored for long periods of time, such as in the instance of sewage sludge, tends to settle out near the lagoon bottom and become difficult to pump without causing damage to the bottom surfaces of the storage lagoon. A unique system is provided by this invention which allows pumping and mixing of such settled solids while preserving the configuration of the lagoon bottom.

Accordingly, it is an object of this invention to provide efficient, low-cost loading of pumpable materials, and especially of sewage sludge, from storage lagoons.

It is another object of this invention to provide an odor-free storage and material handling system for pumpable materials.

It is another object of this invention to provide a system of material handling which is temperature controlled and independent of weather conditions, especially freezing during winter months.

Further, it is an object of this invention to pump and mix liquids which tend to settle out with age and to accomplish this while preserving the bottom surface and configuration of the storage lagoon.

It is a further object of this invention to provide a handling system for pumpable materials which will control undesirable odors.

SUMMARY OF THE INVENTION

The material to be transported is initially stored in large elongated lagoons or basins. A cover helps prevent freezing of the liquid during winter, controls the entry of moisture and contaminants, and prevents undesirable odors from escaping into the atmosphere. The lagoon also may be fitted with heating lines or pipes to maintain the proper liquid temperature or to prevent freezing.

Parallel guides run along the sides of the lagoon and provide a track for a self-propelled platform which spans the lagoon and is movable over the length of the lagoon. A pumping system is supported on the platform, with the pumps having their intake portions extending down through the platform and submerged in the lagoon liquid. Discharge conduit extends over a vehicle track along the lagoon for discharging the pumped liquid into vehicles on that track. Bypass conduit are provided to permit recirculating of the liquid and continuous operation of the pumps.

A unique elongated flap valve in the lagoon cover permits the pump conduits to pass through the cover and to be moved with the platform. Possible escape of odors is further prevented or limited by the use of a car flap valve, on each vehicle, which is opened by the hydrodynamic force of impinging liquid and which automatically closes when the liquid flow ceases.

A control console is provided on the platform where the operator may observe the loading of each vehicle and operate the valving necessary to stop, start and divert the pumped liquid, as well as the movement of the platform.

Advantages and objects in addition to those mentioned above will become apparent upon reading the detailed description and upon reference to the drawings.

BRIEF DESCRIPTION OF THE DRAWINGS

In the accompanying drawings:

FIG. 1 is a cross-section taken along line 1—1 of FIG. 8, showing a material handling system embodying teachings of this invention;

FIG. 2 is a cross-section taken along line 2—2 of FIG. 1;

FIG. 3 is a plan view of the handling system, and showing a unit train consist and two positions of the platform;

FIG. 4 is a top view of a portion of the elongated flap valve showing how a pump intake conduit opens this flap valve;

FIG. 5 is a cross-section taken along the line 5—5 of FIG. 4, showing the deflected condition of the flexible flap valve segments;

FIG. 6 is a top view of a tank car flap valve;

FIG. 7 is a cross-sectional view taken along line 7—7 of FIG. 6 and depicts deflection of the flexible members by the hydrodynamic force of the discharge flow; and FIG. 8 is a partial top view of the platform, lagoon and siding.

DESCRIPTION OF THE PREFERRED EMBODIMENT

While the invention will be described in connection with a presently preferred embodiment and procedure, it will be understood that it is not intended to limit the invention to that embodiment or procedure.

The material handling system illustrated in the drawings includes an elongated storage lagoon 10, trackways 12 on the tops of the dikes 14 at each side of the lagoon, a platform or carriage frame assembly 16 spanning the width of the lagoon and supported on the trackways for selective traversing of the length of the lagoon, and a self-contained pumping system 18 mounted on the platform for pumping stored materials 20, such as sewage sludge, from the lagoon and discharging this material into transport vehicles such as the cars 22 of a train consist on a track 24 which is adjacent to the lagoon 10. A preferred location for the system would be in a relatively flat area, contiguous with the plant producing the liquid 20 to be loaded, and accessible to rail transportation.

Although reference is made particularly to a preferred embodiment for handling sewage sludge material, it will be appreciated that other pumping materials may be handled by systems employing teachings of the invention.

While the lagoon 10 may be of any convenient shape in plan, an elongated configuration as shown in FIG. 3 is preferred, and particularly a lagoon is preferred which is somewhat longer than a unit train (consist) to be loaded.

Referring to FIG. 1, a lagoon cross-section is shown resulting from a cut and fill operation wherein the interior walls or sides 26 of the lagoon taper gradually from the top of the side dikes 14 to the lagoon bottom 30. The slope of the interior lagoon walls 26 may be a function of the slope stability of the material used to construct the lagoon. Or, the lagoon could be constructed from some durable material such as concrete and set below or above grade.

The ways 12 are reinforced concrete tire-ways positioned on the top of the dikes 14. These ways 12 provide a guiding means for motorized trucks 32 which support and propel the platform 16 over the lagoon 10. Ways 12 may be cast from concrete with an appropriate foundation and a cross-section affording a raised center guide curb 33 as indicated in FIG. 1.

Referring further to FIG. 1, a cover 34 extends over the lagoon between the platform 16 and the upper surface of the material 20. This cover 34 may be supported on horizontal girders 36 which are supported on the dikes 14 and on posts 38. The cover 34 includes two side sections 34a and 34b defining a central slot 40 therebetween extending the length of the lagoon parallel to trackways 12 and positioned over the deepest portion of the lagoon. This slot is normally closed by an elongated flap valve 42 which comprises a pair of long flexible segments 44 attached to and extending in cantilever fashion from the cover sections 34a and 34b into abutting or overlapping relation to close the slot 40 when these flaps are in a normal generally co-planar relaxed state. Each intake conduit 50 and each recirculating conduit 66 (referred to below) automatically plows the valve 42 open for its own passage by deflecting the flexible segments 44 as the system 18 is moved along the lagoon parallel to slot 40. FIGS. 4 and 5 show the construction and operation of the preferred flap valve 42 in greater detail. The flexible segments 44 may be fabricated from reinforced rubber or other flexible material.

Insulation may be employed in the cover construction to help maintain the temperature of the liquid 20. In order to further prevent freezing of the liquid 20, or to maintain a desired temperature, heating elements 46 may be positioned in or near the lagoon 10. These elements may derive their heating capacity from electrical power or from heated fluids such as steam carried in conduits at 46. While defined as heating elements, both heating and cooling may be provided in conduits at 46 to maintain any desired temperature of the liquid.

Platform 16 preferably is a structural steel weldment designed to support pumps, piping and all the related equipment of the pumping system 18 for transferring material such as sludge from the lagoon 10 to the transport vehicles 22. The platform 16 spans the lagoon 10 and ways 12 and extends over the vehicles 22 as shown in FIG. 1. The motorized trucks 32 are attached to the platform and run on the ways 12 to move the platform and the system 18 along the lagoon. The motorized trucks illustrated in FIG. 1 are rubber-tired, electrically driven, wheel arrangements. Other supports and drives, such as metal rails and flanged wheel systems may be used for moving and guiding the platform along the lagoon.

System 18 includes three pumps 48 mounted on the platform 16 with their intake conduits 50 extending downward through slot 40, as shown in FIGS. 1, 4 and 5, and connecting to pump intakes 52. These pumps 48 pump the sludge 20 from the lagoon and into the vehicles 22 through a piping and valve control system.

The piping arrangement on the platform 16 is best shown in FIG. 8. The three pumps 48 and their intake conduits 50 are aligned longitudinally of the lagoon. Discharge conduits 54 and 56 lead from the outside pair of pumps, through butterfly valves at 58 and electrically operated quick closing valves 60, to outlets 62 positioned over the vehicle track 24. Bypass lines 64 extend from valves 60 to and through the slot 40, with vertical discharge portions 66 being aligned with the intake conduits 50 longitudinally of the lagoon as seen in FIGS. 2 and 8. The middle pump 48 is connected to both conduits 54 through a Y connection 68 having a butterfly valve 70 in each leg as shown in FIG. 8. The two outside pumps may be used normally, while the middle pump can be used as a standby or spare. The middle pump is placed in service by closing the butterfly valve 58 on the outside pump to be shut down and opening the respective butterfly valve 70 of the center pump. Flow is then directed from the center pump to the respective valve 60 and discharge conduit 56.

The piping arrangement on the platform allows an operator to fill each vehicle as it is traversed by outlets 62 during traverse of the platform over the lagoon. When the desired capacity of each vehicle is reached, the operator actuates the respective valve 60 to redirect the flow back into the lagoon through the bypass system, and then completely shuts off the flow through the outlet 62 by means of an electrically operated knife valve 72 at the end of the discharge conduit to preclude unsightly discharge onto covered portions of the vehicles or onto the right-of-way between vehicles. It is desirable to operate the in-service pumps 48 continuously, bypassing the liquid back into the lagoon when the flow is shut off to the vehicles as indicated. The bypass conduits 66 preferably are extended to about the level of the intakes 52, above a scour shield 74, to help mix the material during such bypass operation.

The scour shield 74 preferably extends beneath the lower ends of the pump intakes 52 and the outlets of the bypass conduits 66. The shield 74 is made up of a series of elongated members 76, such as small diameter pipes or bars, formed into the shape shown in FIG. 1. These elongated members 76 are placed in spaced relationship with each other to form a grill. They are held in this position by welding to beams 78. Beams 78 preferably are supported on the pump intakes 52 and bypass conduits 66, as by the struts and braces 80 and 82. The purpose of this horizontal shield 74 is to enable the intakes and bypass outlets to be operated close to the bottom 30 without damaging the bottom surface of the lagoon. By selection of the size of the pipes or bars 76 and the diametric spacing therebetween, the shield 74 will control and disperse the flow created by the negative pressures of suction from intakes 52 and the positive pressures of bypass discharge from conduits 66 so that removal or mixing of the settled solids below the shield is possible while preserving the bottom of the lagoon against damage, such as from eroding or agitation due to flow of the material. Further, fixing the shield below the bypass conduit helps to break up and mix any settled solids as the platform 16 is moved, thereby making the material more susceptible to pumping. The greatest degree of mixing will normally occur during the bypass operation when liquid is diverted back into the lagoon through the bypass conduits.

Each knife valve 72 is an electrically operated quick closing knife valve, and each three-port valve 60 is an electrically operated quick closing valve, such as a commercially available DeZurik three-port valve with single style plug. Both of these valves may be controlled by an operator located at a console 84 on a platform extension 86 over the top of the vehicles 22, in order that the operator may observe the filling of the vehicles. Console 84 may also be used to control the drives to trucks 32 and to operate other equipment located on the platform 16.

Other peripheral equipment located on the platform 16 includes a diesel generator 88 which supplies electrical power to the valve motors, pumps 48, motorized trucks 32, console 84, auxiliary lighting, and a compressor 90. Compressor 90 supplies compressed air to inflate tires, clean equipment, or loosen material that may have settled out of the stored liquid 20.

The illustrated track 24 may be a conventional railroad siding, preferably laid substantially parallel to and along the length of the lagoon as shown in FIGS. 1, 3 and 8. However, any adequate road or roadbed appropriately positioned near the lagoon to accommodate transport vehicles will suffice. Also, while a straight sided lagoon 10 and a straight siding 24 are shown for illustration, the invention is not limited to these configurations. A curved or even circular lagoon perimeter and track may be appropriate under some conditions.

A unit train consist formed from a plurality of rail cars 22 is shown on the siding 24 in FIG. 3. These rail cars may comprise any appropriate containers such as hopper cars, tank cars or vehicular tank trucks on trailer cars. A railroad system is preferred because of large available capacity and accessibility to both metropolitan and agricultural regions.

For loading open hoppers, or other vehicles with elongated access opening, the pumps and related system may be sized to load a vehicle within two-thirds of the time required for the outlets 62 to traverse that portion of the vehicle which is open for loading. In loading through small ports, such as on a tank car as shown in FIGS. 6 and 7, the platform would be stationary during loading of each vehicle, and could be moved between each such loading.

The vehicles 22 may be closed to reduce odor problems, while retaining loading convenience, by the installation of appropriate covers and flap valves similar to the valve 42 referred to above. Thus a hopper car may be provided with a slotted cover and an elongated closure flap valve for loading while the system 18 traverses the length of the car. Referring to FIGS. 6 and 7, a preferred construction is indicated for flap valves 92 for a circular opening, as in a tank car. Pie-shaped members 94 of flexible material, such as reinforced rubber, are positioned around a circular opening in the top of the tank. FIG. 7 indicates how the flexible members are deflected downward by the hydrodynamic force of the discharged liquid 20 thereby opening the valve for ingress of the material. The valve closes when the liquid flow stops thereby strictly limiting possible escape of odors into the atmosphere. An elongated flap valve extending along the length of a hopper car, as referred to above, will admit materials in the same manner.

As the pumps are operated and the platform moves along the lagoon, the material 20 is drawn from the lagoon and discharged into successive vehicles through the discharge conduit. Each vehicle is rapidly and uniformly filled with the material 20. The platform may move continuously or intermittently as the operator desires, and as the vehicle configuration and access openings permit.

Thus it is apparent that there has been provided, in accordance with the invention, a material handling system that meets the objects set forth above. While the invention has been described in conjunction with specific and preferred embodiments thereof, it is evident that many alternatives, modifications, and variations will be apparent to those skilled in the art, particularly in light of the foregoing description. Accordingly, it is intended to encompass all such alternatives, modifications, and variations as fall within the spirit and scope of the appended claims.

What is claimed is:

1. A system for rapidly loading vehicles with pumpable materials, comprising in combination an elongated storage lagoon for such materials, a vehicle facility located adjacent to and extending generally longitudinally of and parallel to said lagoon for positioning a series of vehicles thereon to receive such materials, a support frame spanning said lagoon in a direction transverse to said vehicle facility, means movably supporting said frame above said lagoon, means for propelling said frame longitudinally of said lagoon, a pump supported on said frame and having an intake in said lagoon, and conduit means supported on said frame, said conduit means being connected to said pump and having a discharge portion extending over said vehicle facility for receiving such materials from said pump and directing such materials into such vehicles positioned on said facility, for loading such vehicles with such materials from successive positions of said frame and said supported pump and conduit along said lagoon.

2. A system as in claim 1 including a cover over said lagoon and beneath said support frame, said cover being provided with an elongated opening for passage of said intake therethrough, said opening extending longitudinally of said lagoon for movement of said intake therealong as said frame is moved longitudinally of said lagoon, and an elongated flexible flap valve normally closing said opening and allowing such movement of said intake.

3. A system as in claim 1 in which said vehicle facility is a rail siding, and including a consist of rail cars on said siding positioned beneath the path of movement of said discharge portion for receiving such materials therefrom.

4. A system as in claim 3 wherein said rail cars are covered and are provided with access openings in the tops thereof, and flap valves normally closing said access openings and being movable under the hydrodynamic force of such materials discharged from said discharge portion to admit such materials into said cars.

5. A system as in claim 1 including a cover over said lagoon and beneath said support frame, said cover including closure means allowing selective access to said pumpable materials by said intake.

6. A system as in claim 1 including bypass conduit means for selectively redirecting the pumped materials back into the lagoon.

7. A system as in claim 6 including shield means positioned between an outlet of said bypass conduit means and the lagoon bottom.

8. A system as in claim 7 wherein said shield extends beneath said intake and is supported from said support frame.

9. A system as in claim 1 including shield means disposed between said intake and the bottom of said lagoon, said shield means comprising a plurality of elongated members positioned in diametric spaced relationship to one another.

10. A system as in claim 1 including heating means located in said lagoon to control the temperature of said materials.

11. Apparatus for rapidly loading pumpable materials from an elongated storage lagoon into a series of vehicles, comprising a vehicle facility located adjacent to and extending generally longitudinally of and parallel to said lagoon for positioning a series of vehicles thereon to receive such materials, support tracks positioned along opposite sides of said lagoon parallel to said vehicle facility, a carriage frame assembly spanning said lagoon in a direction transverse to said vehicle facility and movably supported on said tracks for traversing said lagoon, means for propelling said frame along said tracks, a pump mounted on said carriage frame assembly and having an intake in said lagoon, and conduit means supported on said carriage frame assembly, said conduit means being connected to said pump and having a discharge portion extending over said vehicle facility for receiving such materials from said pump and directing such materials into a series of such vehicles positioned on said facility, for loading such vehicles with such materials from successive positions of said carriage frame assembly and said supported pump and conduit along said lagoon.

12. Apparatus as in claim 11 for loading a series of elongated vehicles positioned on said vehicle facility parallel to said lagoon and each provided with an upwardly open material receiving opening extending longitudinally over a substantial portion of the length of the respective vehicle, wherein said propelling means propels said frame along said lagoon and thereby moves said discharge portion over said vehicle openings as such material is pumped from said lagoon and is discharged from said discharge portion into said openings.

13. Apparatus as in claim 11 including a plurality of pumps on said carriage and each having an intake extending into such lagoon.

14. Apparatus as in claim 11, said conduit means including bypass means for selectively returning such pumped materials to such lagoon, valve means in said conduit means for controlling such bypass and for shutting off discharge of such materials to said vehicles.

15. Apparatus as in claim 14 including controls for said pumps and for said valve means mounted on said carriage frame assembly.

16. A method for loading pumpable materials from an elongated storage lagoon into vehicles, comprising positioning a plurality of vehicles in a line parallel to and near the lagoon, pumping said materials from the lagoon with a pump system which is movable along said lagoon and which has a discharge extending over said line of vehicles, moving said pump system along said lagoon generally parallel to said vehicles and thereby simultaneously moving said discharge to successive vehicles, and discharging the pumped materials into such successive vehicles in said line.

17. A method as in claim 16 wherein such materials are pumped continuously by said system, and including discharging the pumped materials back into said lagoon when such materials are not being discharged into one of said vehicles.

18. A method as in claim 16 including mixing said materials in said lagoon.

19. A method as in claim 16 including moving a scour shield through said materials in said lagoon to agitate said materials.

20. A method as in claim 16 wherein said vehicles in such line are provided with elongated receiving openings oriented generally parallel to said lagoon, wherein said materials are pumped from said lagoon and discharged into said vehicles while said pump system is being so moved along said lagoon.

* * * * *